(12) United States Patent
Bailey et al.

(10) Patent No.: US 6,598,144 B1
(45) Date of Patent: Jul. 22, 2003

(54) ARRANGEMENT FOR LIMITING ACCESS TO ADDRESSES BY A CONSUMER PROCESS INSTIGATING WORK IN A CHANNEL ADAPTER BASED ON VIRTUAL ADDRESS MAPPING

(75) Inventors: Joseph A. Bailey, Austin, TX (US); Norman Hack, Pflugerville, TX (US); Rodney Schmidt, Dripping Springs, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 35 days.

(21) Appl. No.: 10/012,552

(22) Filed: Dec. 12, 2001

(51) Int. Cl.$^7$ .............................................. G06F 12/00
(52) U.S. Cl. ........................ 711/203; 711/202; 711/206; 711/220
(58) Field of Search ................................ 711/203, 202, 711/206, 220

(56) References Cited

U.S. PATENT DOCUMENTS

| 6,026,448 | A | * | 2/2000 | Goldrian et al. | ............ | 709/212 |
| 6,505,229 | B1 | * | 1/2003 | Turner et al. | ............... | 709/107 |
| 6,519,686 | B2 | * | 2/2003 | Woodring et al. | .......... | 711/147 |
| 6,530,043 | B1 | * | 3/2003 | Beardsley et al. | ............ | 714/52 |
| 2001/0003193 | A1 | * | 6/2001 | Woodring et al. | .......... | 709/310 |

OTHER PUBLICATIONS

InfiniBand Trade Association, "InfiniBand Architecture Specification vol. 1, Release 1.0," pp 1, 64–65, 108–116, 446–515, 790–812, Oct. 24, 2000.*
Compaq Computer Corporation et al., "Virtual Interface Architecture Specification, Version 1.0" pp 1–83, Dec. 16, 1997.*
Sullivan, "Virtual Interface Architecture Primer," Dedicated Systems Magazine, http://www.dedicated-systems.com, pp 12–18, 2000 Q1.*
Dell Computer Corporation, "InfiniBand Architecture: Next–Generation Server I/O," whitepaper, pp 1–10, http://www.dell.com, Oct. 2000.*
Compaq Computer Corporation, "InfiniBand Architectural Technology," Technology Brief, pp 1–14, http://www.compaq.com, document No. TC000702TB, Jul. 2000.*
Buonadonna et al., "An Anaysis of VI Architecture Primitives in Support of Parallel and Distributed Communication," http://www.cs.berkely.edu/~philipb/papers/split-c.pdf,pp 1–12, Apr. 17, 2000.*
Daniel Cassiday, InfiniBand™ Architecture Tutorial, Hot Chips, Sun Microsystems, Aug. 2000, 79 pages.

* cited by examiner

*Primary Examiner*—Matthew Kim
*Assistant Examiner*—Stephen Elmore
(74) *Attorney, Agent, or Firm*—Manelli Denison & Selter PLLC; Leon R. Turkevich

(57) ABSTRACT

An operating system resource, configured for establishing communications between consumer processes configured for generating respective work notifications and a host channel adapter configured for servicing the work notifications, assigns virtual address space for use by the consumer processes in executing memory accesses, and respective unique mapping values. An address translator includes a translation map for uniquely mapping the virtual address space used by the consumer processes to a prescribed physical address space accessible by the host channel adapter. The address translator, in response to receiving from an identified consumer process the work notification at a virtual address, maps the work notification to a corresponding prescribed physical address based on the corresponding mapping value assigned to the identified consumer process, enabling the host channel adapter to detect the work notification for the consumer process.

10 Claims, 4 Drawing Sheets

ARRANGEMENT FOR LIMITING ACCESS TO ADDRESSES BY A CONSUMER PROCESS INSTIGATING WORK IN A CHANNEL ADAPTER BASED ON VIRTUAL ADDRESS MAPPING

BACKGROUND OF THE INVENTION

1. Field of the Invention

The present invention relates to interaction between a verbs process and a host channel adapter configured for communication with target channel adapters in an Infini-Band™ server system, and more particularly to management of the verbs process during generation of work notifications, also referred to as "doorbells", that notify the host channel adapter of work queue entries to be serviced.

2. Background Art

Networking technology has encountered improvements in server architectures and design with a goal toward providing servers that are more robust and reliable in mission critical networking applications. In particular, the use of servers for responding to client requests has resulted in a necessity that servers have an extremely high reliability to ensure that the network remains operable. Hence, there has been a substantial concern about server reliability, availability, and serviceability.

In addition, processors used in servers have encountered substantial improvements, where the microprocessor speed and bandwidth have exceeded the capacity of the connected input/output (I/O) buses, limiting the server throughput to the bus capacity. Accordingly, different server standards have been proposed in an attempt to improve server performance in terms of addressing, processor clustering, and high-speed I/O.

These different proposed server standards led to the development of the InfiniBand™ Architecture Specification, (Release 1.0), adopted by the InfiniBand™ Trade Association. The InfiniBand™ Architecture Specification specifies a high-speed networking connection between end nodes (e.g., central processing units, peripherals, etc.) and switches inside a server system. Hence, the term "InfiniBand™ network" refers to a private system area network (SAN) that connects end nodes and switches into a cluster within a server system, enabling the sharing of cluster resources. The InfiniBand™ Architecture Specification specifies both I/O operations and interprocessor communications (IPC).

A particular feature of InfiniBand™ Architecture Specification is the proposed implementation in hardware of the transport layer services present in existing networking protocols, such as TCP/IP based protocols. The hardware-based implementation of transport layer services, referred to as a "channel adapter", provides the advantage of reducing processing requirements of the central processing unit (i.e., "offloading" processor code execution), hence offloading the operating system of the server system. Host channel adapters (HCAs) are implemented in processor-based nodes, and target channel adapters (TCAs) are implemented in peripheral-based nodes (e.g., network interface devices, mass storage devices, etc.).

However, arbitrary hardware implementations may result in substantially costly or relatively inefficient hardware designs. One example involves the servicing of work notifications, also referred to as "doorbells". Doorbells are generated by verbs consumer processes (e.g., operating system supplied agents) that post a work request (e.g., a work queue entry (WQE)) to a prescribed queue of an assigned queue pair in system memory; the verbs consumer process then sends the work notification to notify the host channel adapter (HCA) of the work request in system memory.

One concern in implementing the servicing of work notifications is the susceptibility of the HCA to unauthorized work notifications. In particular, the InfiniBand™ Architecture Specification specifies that the verbs consumer processes may be implemented as "ring 0" (kernel mode) or "ring 3" (user mode) processes: kernel mode have unrestricted access to any hardware resource accessible by the operating system. Hence, a concern exists that if a malicious or malfunctioning process improperly accesses an unauthorized address, for example a work notification address assigned to a second verbs consumer process, such improper access may cause the HCA to erroneously determine that the second verbs consumer process generated a work notification. Hence, the susceptibility of HCA to unauthorized work notifications by a malicious or malfunctioning process may cause a reliability concern that affects HCA operations. Moreover, concerns arise that such a malicious or malfunctioning process may further affect the reliability of the overall server system, for example compromising security routines normally utilized to prevent unauthorized transmission of private data (e.g., credit card information, etc.) across a public network such as the Internet.

Page-based addressing has been used in processor architectures, for example the Intel-basedx86 architectures, to reconcile differences between physical address space and virtual address space. For example, a personal computer capable of addressing 512 Mbytes may only have 128 Mbytes of installed memory; the operating system uses memory segments divided into discrete blocks, referred to as pages, that can be transferred between the physical memory and virtual memory allocated on a hard disk. Hence, the attempted execution of executable code that does not reside in physical memory results in generation of a page fault exception, causing the processor to swap unused pages in physical memory with the pages in virtual memory containing the required executable code. However, different processes still may access the same physical page of memory, since the operating system typically will provide processes a common mapping between the virtual page address and the physical memory address in I/O address space to enable the processes to access the same I/O device control registers of an I/O device within the I/O address space.

SUMMARY OF THE INVENTION

There is a need for an arrangement that enables a host channel adapter to be implemented in an efficient and economical manner.

There also is a need for an arrangement that enables a host channel adapter to service work notifications in a secure manner, without the risk of access to the host channel adapter via unauthorized addresses by unauthorized processes.

These and other needs are attained by the present invention, where an operating system resource, configured for establishing communications between consumer processes configured for generating respective work notifications and a host channel adapter configured for servicing the work notifications, assigns virtual address space for use by the consumer processes in executing memory accesses, and respective unique mapping values. An address translator includes a translation map for uniquely mapping the virtual address space used by the consumer processes to a prescribed physical address space accessible by the host channel adapter. The address translator, in response to receiving from an identified consumer process the work notification at a virtual address, maps the work notification to a corresponding prescribed physical address based on the corresponding mapping value assigned to the identified consumer process, enabling the host channel adapter to detect the work notification for the consumer process.

Hence, the host channel adapter can identify and service work requests based on the prescribed destination address identifying the consumer process, where the mapping of the virtual address to the prescribed physical address supplied by the operating system resource ensures access by the consumer process is limited to a prescribed physical address space, preventing improper addressing by the consumer process.

One aspect of the present invention provides a method in a host computing system. The method includes assigning, by an operating system resource, a prescribed virtual address space and a corresponding mapping value for use by a consumer process for execution of a memory access. The method also includes loading a unique translation map entry having the corresponding mapping value for the consumer process into an address translator configured for controlling the memory access to a physical address space assigned for access to a host channel adapter. The method also includes outputting by the address translator a work notification, received from the consumer process and specifying a prescribed virtual destination address within the prescribed virtual address space, to a corresponding mapped physical destination address within the mapped physical address space based on the unique translation map entry, the host channel adapter configured for detecting the work notification at the mapped physical destination address.

Another aspect of the present invention provides a host computing system comprising a host channel adapter, an address translator, and an operating system resource. The host channel adapter is configured for performing a work request, generated by a consumer process, for access to a system area network in response to detecting a work notification at a prescribed physical destination address. The address translator is configured for outputting the work notification, received from the consumer process and specifying a prescribed virtual destination address, to the host channel adapter at the prescribed physical destination address based on a unique translation map entry having a mapping value for mapping the prescribed virtual destination address for the corresponding consumer process to the corresponding physical destination address. The operating system resource is configured for assigning to the consumer process a prescribed virtual address space including the prescribed virtual destination address, and the corresponding mapping value.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
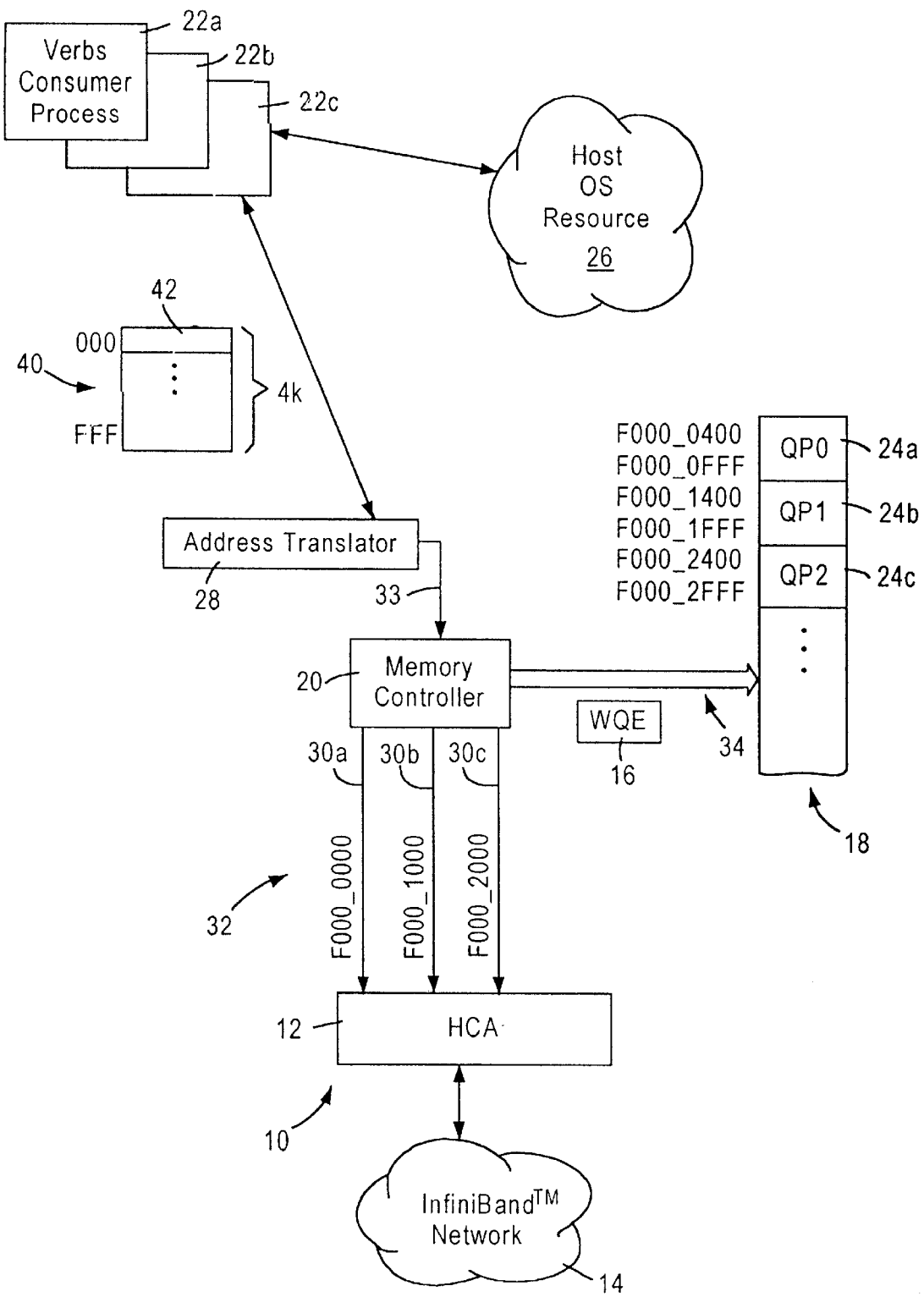
FIG. 1 is a diagram illustrating a host computing node configured for servicing work notification requests according to an embodiment of the present invention.

FIG. 1 is a block diagram illustrating a host computing node 10 having a host channel adapter (HCA) 12 configured for generating and transmitting packets onto an InfiniBand™ network 14, according to an embodiment of the present invention. The HCA 12 is configured for sending and receiving data packets on the InfiniBand™ network 14 based on work queue entries (WQEs) (i.e., work descriptors) 16 stored in system memory 18. In particular, each verbs consumer process 22 executed by a processor core is assigned a corresponding queue pair buffer 24 by an operating system resource 26. Each verbs consumer process 22 requests work to be performed by the HCA 12, for example sending data to a destination, a remote direct memory access (RDMA) read operation, or an RDMA write operation, by sending the associated work descriptor 16 to the assigned queue pair buffer 24. For example, if a verbs consumer process 22 wishes to send data, the corresponding WQE 16 is sent to a corresponding send queue of the assigned queue pair buffer 24. If the verbs consumer process 22 wishes to perform an RDMA read operation, the corresponding WQE 16 is placed in the corresponding send queue of the queue pair 24; a separate RDMA read response structure is used to transfer into system memory the requested RDMA read response data supplied from the target/responder. The receive queue of the queue pair buffer 24 is used for inbound requests that target the corresponding process 22.

The verbs consumer process 22 notifies the HCA 12 of the work queue entry 16 added to the send queue of the queue pair buffer 24 by generating a work notification 30 for the corresponding work queue entry 16. Hence, the work notification 30, also referred to as a "doorbell", is used by the verbs consumer process 22 to notify the HCA 12 that there is work to be performed, specified by the work queue entry 16 stored in the queue pair buffer 24.

According to the disclosed embodiment, access to memory mapped resources is controlled by the operating system resource 26 in a manner that ensures that each verbs consumer process 22 is prevented from accessing memory mapped I/O address regions 32 of the HCA 12 or system memory mapped address regions 34 of the system memory 24 that are not assigned to the verbs consumer process 22. In particular, the operating system resource 26 assigns a virtual address space 40 for use by the verbs consumer processes 22; the virtual address space 40 is uniquely mapped by an address translator 28 to physical address space 33, including the memory mapped I/O address space 32 and system memory mapped address space 34, for each of the verbs consumer processes 22 based on respective translation map entries 36 stored within a translation table, illustrated in FIG. 4 as translation table 38.

In particular, the virtual address space 40 is assigned by the operating system resource 26 as a contiguous range of addresses, selected as a page 40 having an addressable range, for example, of 4 kilobytes. Hence, each verbs consumer process 22 can be assigned virtual address space 40 in the form of a 4 kilobyte page 40 addressable using 12 address bits. Each verbs consumer process 22 accesses the memory mapped I/O address regions 32 or the system memory mapped address regions 34 by executing a write to a virtual address 42. The address translator 28 maps the virtual address 42 to a physical address 33 based on retrieving the corresponding unique translation map entry 36 storing a corresponding unique mapping value 46 for the identified consumer process 22, implemented for example as a physical address offset relative to other mapping values based on the prescribed size of the page 40. The mapping values 46 are established, for example, based on unique page tables and page directories established by the operating system resource 26 that uniquely map the virtual address 42.

The retrieved mapping value 46 is used to map the virtual address 42 to a physical address 33. The memory controller 20 is configured for distinguishing the physical address 33 as specifying either an I/O mapped address in I/O address space 32, or a system memory mapped address in system memory space 34, based on prescribed offsets relative to the HCA base address in the I/O address space 32. According to the disclosed embodiment, the virtual address "000" (hexadecimal) is used to map doorbells to the memory mapped I/O address region 32 and addresses up to a prescribed offset (e.g., 3FF hexadecimal) can used for other I/O accesses, whereas virtual addresses "400" to "FFF" are used to map memory access commands by the verbs consumer process 22 to the system memory mapped address region 34.

Figure 4:
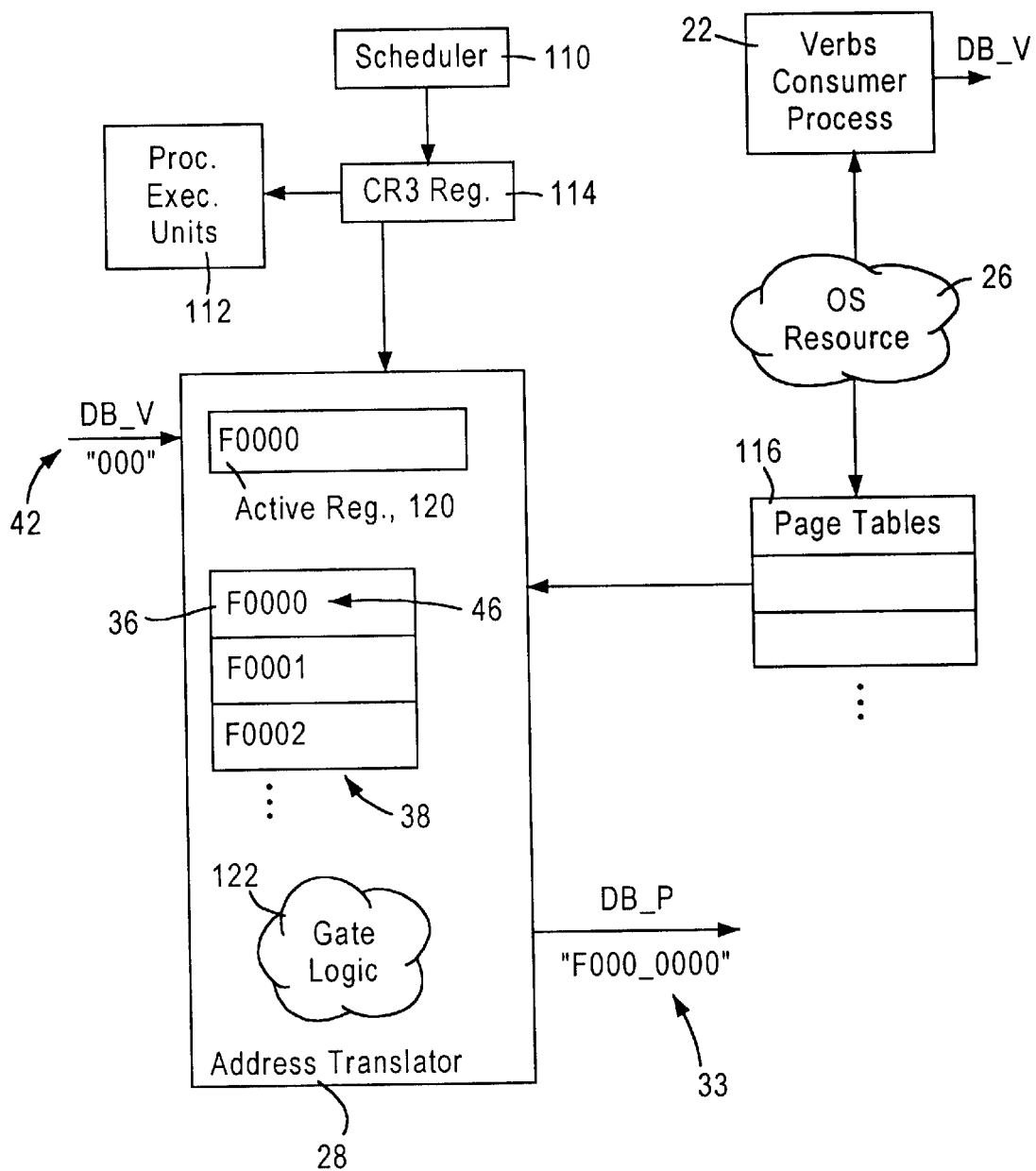
FIG. 4 is a diagram illustrating in further detail the address translator of FIG. 1.

FIG. 4 is a block diagram illustrating in further detail the address translator 28. The address translator 28 is implemented as part of the processor core, and is configured for translating addresses 42 from the virtual address space 40 to the physical address space 33, based on identifying a process 22 under execution and based on the corresponding translation map entry 36 assigned to the identified process.

In particular, the processor core additionally includes a scheduler 110, processor execution units 112, and the address translator 28. The scheduler 110, implemented for example as a software based task scheduler configured for scheduling execution of processor code for a corresponding selected process 22, identifies for the processor execution units 112 and the address translator 28 the identified process 22 to be executed; for example, the identification by the scheduler 110 may be implemented in x86 based architectures by enabling the scheduler 110 to write the identifier for the identified process 22 to a "CR3" register 114, also referred to as the paging table directory control register.

The operating system resource 26 is configured for establishing for each verbs consumer process 22 the mapping value 46 in the form of a unique page table and directory entry 116 in system memory. Hence, the identifier in the CR3 register 114 serves as a pointer to the corresponding page table and directory entry 116 for use by the processor execution units 112 and the address translator 28 during execution of the scheduled process 22.

In response to the scheduler 110 reloading the CR3 register 114, the address translator 28 loads the mapping values 46 from the unique page table and directory entry 116 specified by the CR3 register 114 into an active register 120. As illustrated in FIG. 4, the mapping values 46 may be cached locally within the translation table 38. The address translator 28 includes gate logic 122 configured for generating a physical address ("DB_P") based on the virtual address 42 ("DB_V") and the mapping value 46 specified in the active register 120.

As an example, during execution by the processor execution units 112, the verbs consumer process 22a issues a doorbell to the HCA 12 by executing a write operation to the virtual address "000" (hexadecimal) (DB_V) 42. The address translator 28, having loaded the corresponding mapping value 46 (illustrated as a 20-bit physical destination address offset "F0000") into the active register 120, maps the 12-bit virtual address "000" "DB_V" 42 using the 122 to obtain a physical 32-bit memory address "DB_P" 33 having a value of "F000_0000". The physical 32-bit memory address "DB_p" 33 having the value of "F000_0000" can then be identified by the memory controller 20 as a doorbell address 30a for the HCA 12 in the memory mapped I/O address space 32.

If the virtual address 42 is a value exceeding the prescribed offset, the memory controller 20 identifies the corresponding mapped physical 32-bit memory address 33 as a system memory mapped address 34 for accessing the corresponding queue pair buffer 24.

Hence, the assignment of unique translation map entries 36 for the respective verbs consumer processes 22 ensures that each verbs consumer process (e.g., 22a) can only access its prescribed queue pair buffer (e.g., QP0) 24 or doorbell (e.g., 30a) via the address page 40 in virtual memory space 40.

Figure 2:
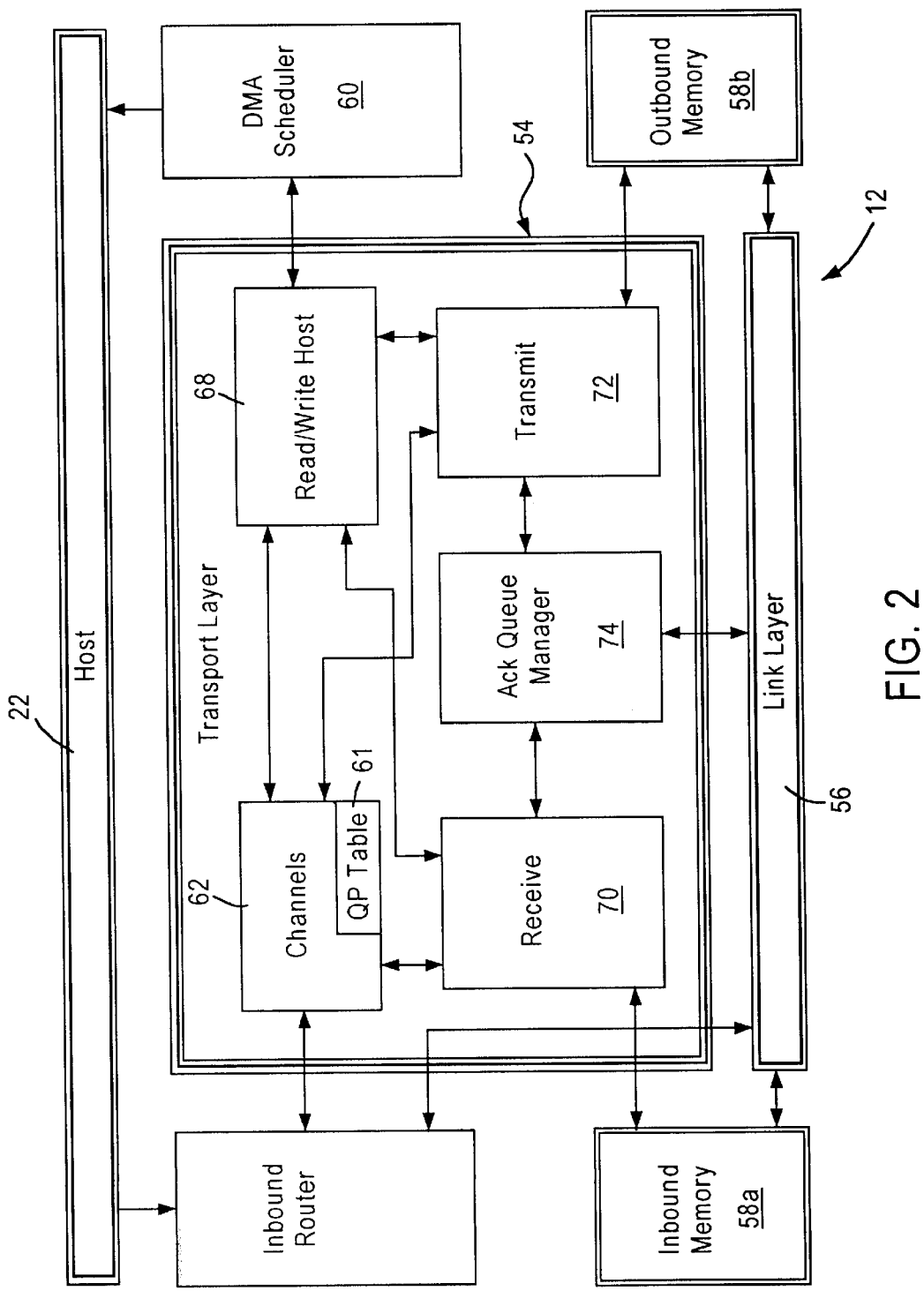
FIG. 2 is a diagram illustrating in detail the transport layer module of FIG. 1.

FIG. 2 is a block diagram illustrating in further detail the HCA 12 according to an embodiment of the present invention. The HCA 12 includes a transport layer 54, a link layer 56, memory buffers 58, and a DMA scheduler 60 configured for fetching the work descriptors 16 from the system memory 18.

The transport layer module 54 includes a channel module 62 having a queue pair attributes table 61. The transport layer module 54 also includes a read/write host manager 68 configured for managing read/write operations to and from the system memory 24 via the DMA scheduler 60, a receive service module 70, a transmit service module 72, and an acknowledgement queue manager 74.

The channels manager 62 is configured for managing transport services, including setup, management, and tear down of queue pairs, including storing a queue pair context entries that specify, for each corresponding queue pair 24, the necessary queue pair attributes including a corresponding notification address 30. In particular, the queue pair table 61 includes the mapping value 46, enabling the HCA 12 to identify the verbs consumer process 22 having generated the work notification 30 based on the physical destination address relative to the offset, based on the page size and the zero-offset address location.

The receive service module 70 is configured for determining whether a receive message includes application based data for a verbs consumer 22, transport service information for the channel manager 62, or an acknowledgment for the acknowledgment queue manager 74.

The transmit service module 72 is configured for generating the appropriate transport layer headers for the retrieved WQEs 16 based on the associated queue pair attributes. The transmit service module 72 also manages transmission of acknowledgments according to connection based requirements (e.g., reliable connection, reliable datagram) specified by the acknowledgment queue manager 74.

The memory buffers 58a and 58b are used for storing receive data and transmit data, respectively.

Figure 3:
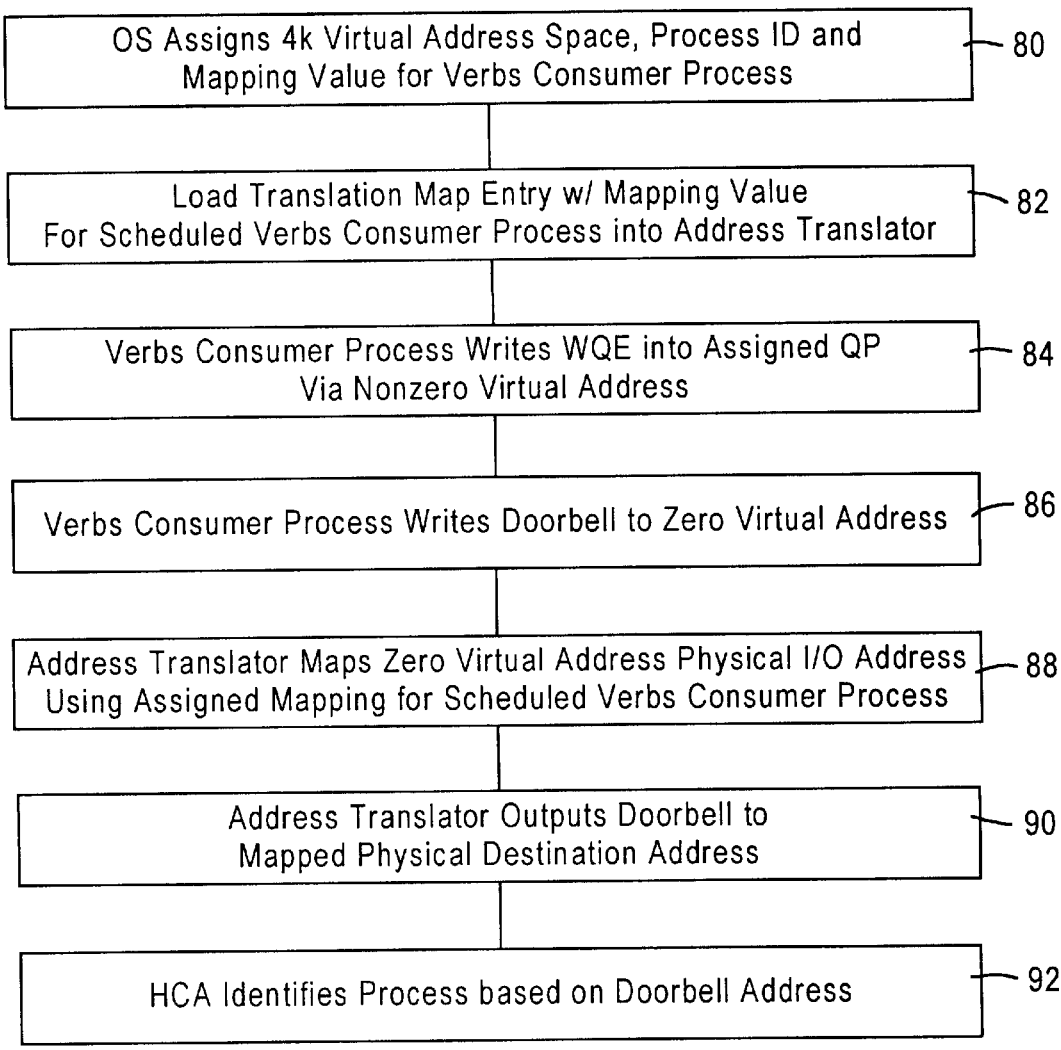
FIG. 3 is a diagram illustrating the method by the host channel adapter of FIG. 1 of servicing a work notification written to a destination address based on the destination address, according to an embodiment of the present invention.

FIG. 3 is a flow diagram illustrating the method of managing access by the verbs consumer processes 22 in generating a work notification according to an embodiment of the present invention. The method begins in step 80, where the operating system resource 26 registers a newly instantiated verbs consumer process 22 by assigning to the verbs consumer process 22 the prescribed virtual address space 40 in the form of a 4 kilobyte address page 40. The operating system resource 26 also assigns in step 80 an identifier for use by the scheduler 110 in scheduling execution of the verbs consumer process, and a unique mapping value 46, illustrated in FIG. 4 as a new page table and directory entry 116. The operating system resource 26 repeats step 80 as each verbs consumer process instance is instantiated.

Once the verbs consumer process 22 has been registered by the operating system resource 26, the verbs consumer process 22 can begin requesting work to be done by the HCA 12. The address translator 28 loads in step 82 a unique translation map entry 36 for the verbs consumer process 22, as the verbs consumer process 22 is scheduled for execution, enabling the address translator 28 to map any virtual address specified by the identified process 22 to a unique physical address.

The verbs consumer process 22 writes in step 84 a work queue entry 16 to its assigned to queue pair buffer 24 by writing the work queue entry 16 in virtual address space 40 to a virtual address having a prescribed address offset relative to the HCA base address. The address translator 28 maps the virtual address to the system memory mapped address space 34 for access to the assigned queue pair buffer 24, based on the corresponding translation map entry 36.

The verbs consumer process 22 then outputs in step 86 a work notification by executing a write operation to the prescribed virtual destination address "DB_v" of "000" 42 for work notifications. The address translator 28 maps in step 88 the prescribed virtual destination address to the physical address space 32 assigned for access to the host channel adapter 12 based on mapping the prescribed virtual destination address 42 to the prescribed physical destination address 30. The address translator 28 outputs in step 90 the doorbell by writing to the mapped physical destination address 30, identified by the HCA 12 in step 92 as a doorbell by the corresponding process 22.

According to the disclosed embodiment, verbs consumer processes are assigned a virtual address space for memory access that is mapped by a address translator using unique translation map entries for the respective processes. Hence, the verbs consumer processes are controlled to limit memory accesses to authorized regions of the physical address space.

Although the disclosed embodiment describes a page 40 having an addressable range of 4 kilobytes, the addressable range selected may be of different sizes, for example 4 megabytes. Moreover, the assignment of a single page 40 to each process 22 is by way of illustration only: each process may be assigned multiple pages, where the corresponding translation map entry 36 stores respective mapping values for the multiple pages. Further, the assignment of virtual addresses is at the discretion of the host OS resource 26, and implemented by writing the appropriate mapping values into the corresponding translation map entry.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a host computing system, the method comprising:

assigning, by an operating system resource, a prescribed virtual address space and a corresponding mapping value for use by a consumer process for execution of a memory access;

loading a unique translation map entry having the corresponding mapping value for the consumer process into an address translator configured for controlling the memory access to a physical address space assigned for access to a host channel adapter; and outputting by the address translator a work notification, received from the consumer process and specifying a prescribed virtual destination address within the prescribed virtual address space, to a corresponding mapped physical destination address within the mapped physical address space based on the unique translation map entry, the host channel adapter configured for detecting the work notification at the mapped physical destination address.

2. The method of claim 1, wherein:

the loading step includes loading, into the address translator, respective unique translation map entries having the respective mapping values specifying respective physical address space offset values for respective consumer processes; and the outputting step includes:

receiving from an identified one of the consumer processes the work notification specifying the prescribed virtual destination address, and outputting the work notification to the corresponding mapped physical destination address based on the corresponding unique translation map entry.

3. The method of claim 2, wherein the assigning step includes assigning as the prescribed virtual address space a contiguous range of addresses, the contiguous range having a prescribed size.

4. The method of claim 3, wherein the assigning step includes selecting the contiguous range of addresses as a four kilobyte address range.

5. The method of claim 3, further comprising identifying, by the host channel adapter, the one consumer process having generated the work notification based on the corresponding mapped physical destination address relative to an offset determined based on the prescribed size and a zero-offset address location.

6. A host computing system comprising:

a host channel adapter configured for performing a work request, generated by a consumer process, for access to a system area network in response to detecting a work notification at a prescribed physical destination address;

an address translator configured for outputting the work notification, received from the consumer process and specifying a prescribed virtual destination address, to the host channel adapter at the prescribed physical destination address based on a unique translation map entry having a mapping value for mapping the prescribed virtual destination address for the corresponding consumer process to the corresponding physical destination address; and an operating system resource configured for assigning to the consumer process a prescribed virtual address space including the prescribed virtual destination address, and the corresponding mapping value.

7. The computing system of claim 6, wherein the operating system resource is configured for assigning to multiple respective consumer processes respective mapping values and the prescribed virtual address space including the prescribed virtual destination address, the operating system resource configured for loading respective unique translation map entries including the respective mapping values into a memory accessible by the address translator.

8. The computing system of claim 7, wherein the operating system resource assigns to the prescribed virtual address space a contiguous range of addresses, the contiguous range having a prescribed size.

9. The computing system of claim 7, wherein the operating system resource is configured for assigning each mapping value based on a corresponding physical address space offset based on the prescribed size.

10. The computing system of claim 7, wherein the host channel adapter is configured for identifying the one consumer process having generated the work notification based on the corresponding mapped physical destination address relative to an offset determined based on the prescribed size and a zero-offset address location.

* * * * *